United States Patent [19]
Brown

[11] 3,837,512
[45] Sept. 24, 1974

[54] REFUSE TRUCK CONTAINER HANDLING MECHANISM

[76] Inventor: Donald C. Brown, Box 194, Botkins, Ohio 45306

[22] Filed: Oct. 30, 1973

[21] Appl. No.: 410,983

[52] U.S. Cl. .................................. 214/302, 214/313
[51] Int. Cl. .............................................. B65f 3/02
[58] Field of Search .......... 214/302, 303, 313, 315, 214/318

[56] References Cited
UNITED STATES PATENTS
2,832,488   4/1958   Kamin............................ 214/302 X
FOREIGN PATENTS OR APPLICATIONS
1,182,592   11/1964   Germany ........................... 214/302
862,245   3/1961   Great Britain ...................... 214/302

Primary Examiner—Robert B. Reeves
Assistant Examiner—Joseph J. Rolla
Attorney, Agent, or Firm—D. Paul Weaver

[57]   ABSTRACT

A power-operated pivotal arm mechanism for moving refuse containers through a long arcuate path between a rear lowered container loading position and a forward inverted container washing position features a sliding link and fixed guide means therefor for imparting to the arms of the mechanism the required arc of movement.

8 Claims, 6 Drawing Figures

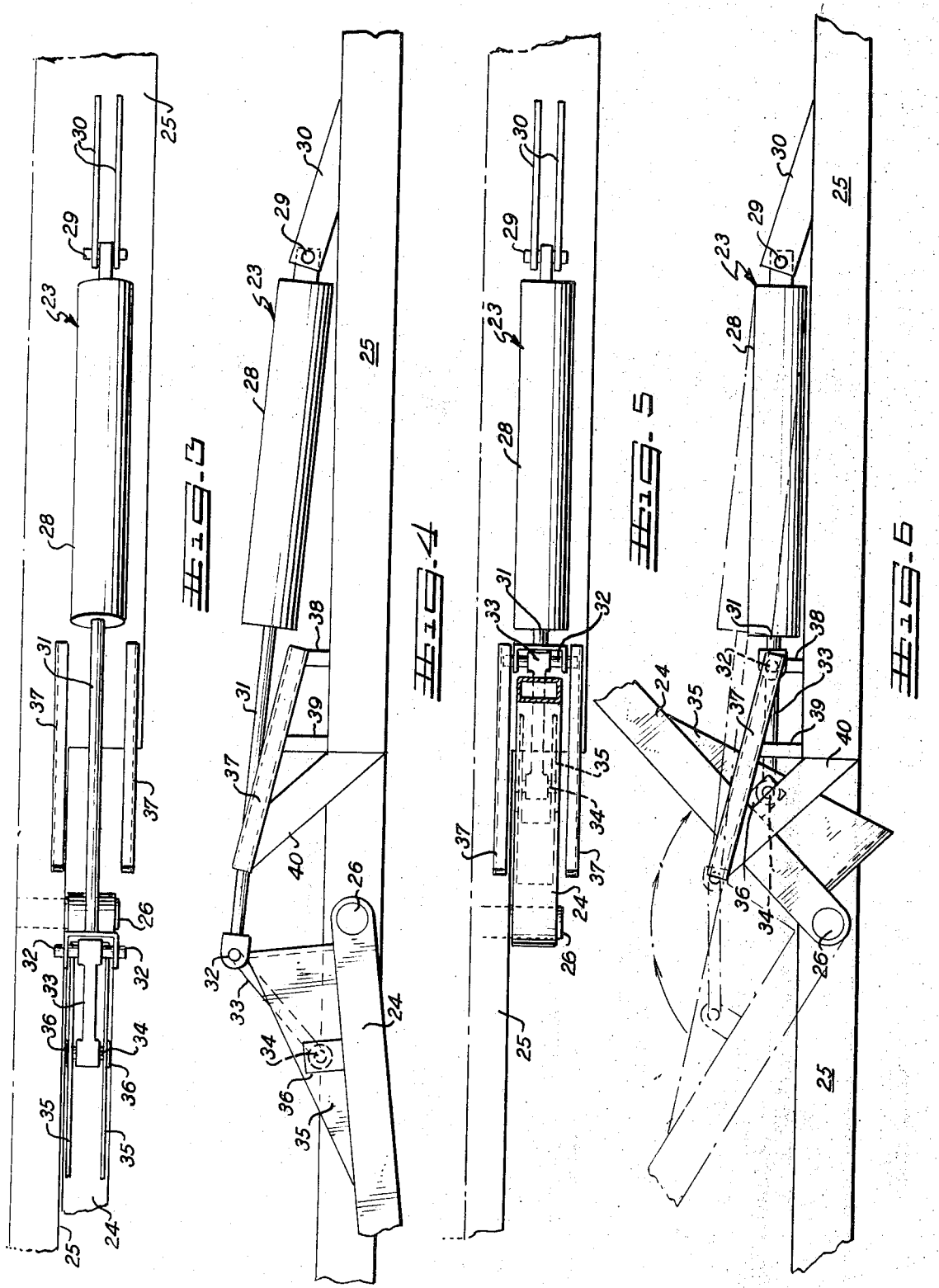

REFUSE TRUCK CONTAINER HANDLING MECHANISM

BACKGROUND OF THE INVENTION

In the rendering industry, trucks have been devised to collect and transport meat scraps, animal skins and raw blood. Such refuse requires special provisions for refuse handling in comparison to conventional trash trucks and the like in daily usage for collecting home trash and garbage.

The type of truck upon which the mechanism of the present invention is utilized embodies a platform or loader for several large refuse cans which is positioned at ground level with the cans upright for receiving the refuse. Following loading, the cans are elevated to tailgate height for transporting on a road and are still generally level although tilted slightly forwardly for security. The refuse truck has a dumping compartment above and forwardly of the rear loading station and into which the refuse in the cans must be dumped by elevating the cans and inverting them substantially above the top of the loading compartment. Still forwardly of the loading compartment and immediately behind the truck cab and at the top of the truck body is an automatic washing station where the refuse cans are sprayed and thoroughly washed while they are held in a completely inverted position, following which washing the cans are returned to their rear transporting or loading positions where they are again upright.

The required movement of the refuse cans from a ground level position at the rear of the truck to a full forward washing position near the front of the truck with the cans fully inverted in the latter position presents a problem, in terms of providing a simple, efficient and economical mechanism to accomplish such movement. The objective of the invention is to solve this problem by providing such a mechanism in a simple and compact form and with great sturdiness and smoothness of operation under load. More particularly, the invention mechanism solves the problem of moving the containers through a sufficient long arc to transport them from the rear of the truck at a ground level upright position to a washing station near the front of the truck where the cans are inverted and elevated. This is accomplished in the invention by the usage of a pair of main lifting arms having fixed pivots, power cylinder units to turn the arms upon their fixed pivots and intermediate short connector links between the arms and the extensible and retractable piston rods of the cylinder units. During their movement with the main lifting arms, the connector links move into contact with stationary inclined guide channels which cause the links to follow a path of movement which assures the necessary arcuate travel of the arms without an excessive and impractical degree of piston rod travel. This linkage means is the essence of the invention, and the movement capability of the linkage makes it possible for the entire operation to take place with a single attendant standing at ground level.

Other features and advantages of the invention will become apparent during the course of the following detailed description.

BRIEF DESCRIPTION OF DRAWING FIGURES

FIG. 3 is a fragmentary plan view of the mechanism with the arms fully lowered.

FIG. 4 is a fragmentary side elevation of the mechanism with the arms fully lowered.

FIG. 5 is a plan view, similar to FIG. 3, showing the mechanism when the arms are fully raised.

FIG. 6 is an elevational view, similar to FIG. 4, showing the mechanism when the arms are fully raised to position the containers at the washing station.

DETAILED DESCRIPTION

Figure 1:
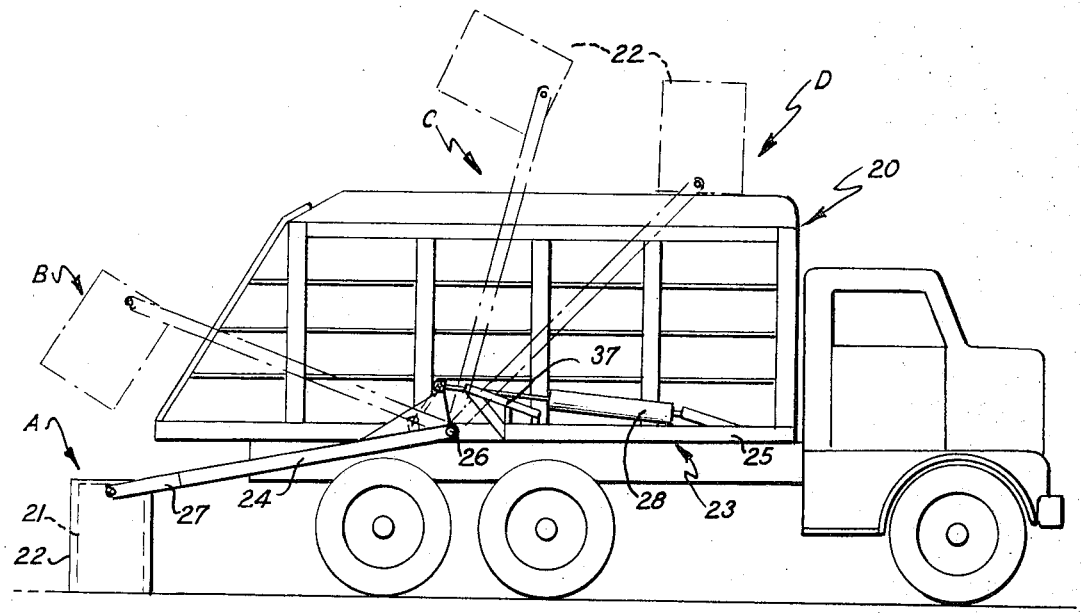
FIG. 1 is a partly diagrammatic side elevation of a refuse truck equipped with the container handling mechanism embodying the invention.
Figure 2:
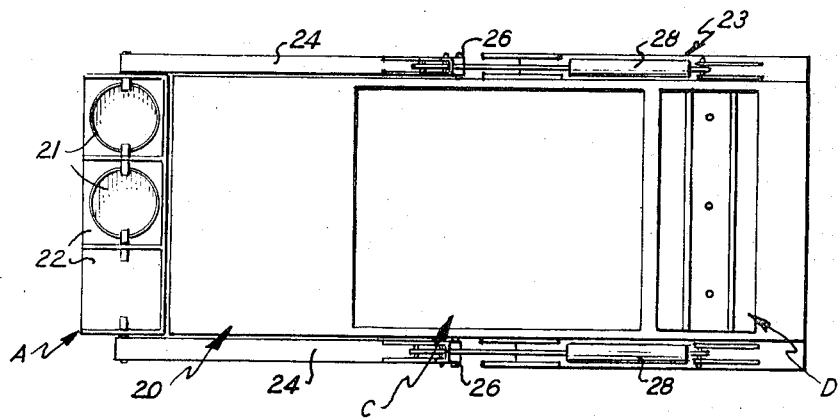
FIG. 2 is a fragmentary plan view of the truck and mechanism on a reduced scale.

Referring to the drawings in detail, wherein like numerals designate like parts, FIGS. 1 and 2 depict schematically a refuse truck 20 of the type used in the rendering industry to collect and transport meat scraps, skins and the like. Such a truck has a fluid tight body and tailgate for sanitary purposes. As shown in FIGS. 1 and 2, refuse containers 21 supported on a platform or loader 22 must be moved from a ground level upright loading position A to a transporting position B at tailgate level and then to an elevated substantially inverted refuse dumping position C at the top of the truck body and well forwardly of its rear end. Finally the containers must be moved still further forwardly while still inverted to a washing position or station D at the forward end of the refuse storage body.

The power-operated mechanism for providing the required movement of the containers to and from the extreme positions A and D is shown in its entirety in FIGS. 1 and 2 and is designated by the numeral 23. The details of the container handling mechanism are more fully shown in FIGS. 3–6. The mechanism 23 embodies a pair of main vertically swingable arms 24 having corresponding ends pivoted to the truck bed 25 on opposite sides of the truck by fixed pivot pins 26. The opposite ends of the arms are rigidly socketed into extensions 27 on the unitary loader or platform 22 which supports the containers 21. The platform 22 has safety container locking means, not shown, and forming no part of this invention. The platform or loader 22 thus forms with the two main arms 24 a rigid substantially U-shaped unit, FIG. 2, for carrying the containers 21 between the extreme positions A and D.

Power means to raise and lower the arms 24 is provided in the form of a pair of simultaneously operable hydraulic cylinder units 28, one on each side of the truck. These hydraulic cylinders are equipped with conventional controls, not shown, allowing a single attendant standing on the ground to completely control the operation of the mechanism.

Referring primarily to FIGS. 3 through 6, each power cylinder 28 has its forward end pivotally secured to a pin 29 with a rigid bracket structure 30, welded or otherwise rigidly secured to the truck bed. The piston rod 31 of each cylinder unit is pivotally connected through a cylindrical pin 32 to a relatively short rigid connector link 33 which in turn has its leading end pivoted through another pin 34 to triangular reinforcing gussets 35, welded to the normally upwardly facing sides of the main lifting arms 24. The gussets 35 may be locally reinforced at 36 adjacent to the pins 34.

As shown, the axes of the pivot pins 34 are spaced forwardly on the arms 24 from the main fixed pivot pins 26 when the main arms are lowered, FIG. 4. At this time, the axes of pivot pins 32 are spaced above both sets of pins 26 and 34 and between the same in a triangular relationship, FIG. 4.

A pair of oppositely facing rearwardly upwardly inclined fixed channel guide rails 37 is arranged on each side of the truck bed and supported by rigid brace or bracket elements 38, 39 and 40 preferably welded between the channel guide rails and the underlying truck bed. These relatively short channel guide rails are disposed between the power cylinder 28 and the fixed main pivots 26. Their purpose is to control the path of movement of the connector links 33 during extension and retraction of the piston rods 31 of the two power cylinder units. The movement and guidance of the two links 33 is essential to imparting the necessary long arcuate travel to the arms 24 carrying the container platform 22. The controlled action of the links 33 renders this relatively great arcuate movement possible without the necessity for an excessive and impractical stroke length for the piston rods 31, and therefore the links 33 and their fixed guidance means form key elements of the invention in combination with the other components of the mechanism.

It will be noted that the pivot pins 32 are extended from the opposite sides of links 33 so as to be engageable within and slidable through the straight parallel guideways of the channel guide rails 37. As shown in FIGS. 3 and 4, when the piston rods 31 are fully extended and the main lifting arms 24 are in the full down positions somewhat below horizontal, the pins 32 are outside of the channel guide rails and forwardly thereof. During the early retraction of the piston rods 31, the arcuate movement of the pins 32 will carry them into the fixed rails 37 whereupon the pins 32 will begin to be guided along straight inclined paths of movement rearwardly and downwardly as established by the channel guide rails. This path of movement causes the main arms 24 to complete their extended movements necessary to carry the containers 21 from positions A to D in FIG. 1. When the arms 24 are in the fully raised positions at position D, the piston rods 31 are fully retracted, FIGS. 5 and 6, and the pins 32 are near the forward ends of the channel guide rails 37. The term " forward ends" as used here means forwardly in relation to the truck 20.

Without the provision of the connector links 33 and the particular guidance thereof along the straight paths dictated by the channel rails 37, it would not be possible to obtain the necessary extent of movement of the arms 24 and the containers 21 without employing power cylinders having excessive and impractical piston stroke lengths and pivot spacings. The use of the links 33 permits the strokes of the cylinder-pistons to be reasonably short and also permits the pivots 26, 32 and 34 to be relatively close together, keeping the geometry of the mechanism compact without losing mechanical advantage. The sliding engagement of the links 33 with rails 37 eliminates any tendency for the mechanism to bind and renders it smooth in its operation. The restraining force exerted on links 33 by the fixed rails 37, causing the pivot pins 32 to travel in a straight inclined path of movement after their initial arcuate movement, FIG. 4, is critical in producing the desired mode of operation. Comparing the positions of the links 33 in FIGS. 4 and 6, it may readily be seen how these links alter their positions with respect to the main arms 24, rails 37 and cylinders 28 during movement of the mechanism from the full down to the full up or container washing position. While the links 33 travel only a relatively short distance, their displacement in connection with the rails 37 and other associated elements is sufficient to produce the relatively great arc of movement required for the arms 24. In the final up positions of the arms 24, FIG. 6, the links 33 and cylinders 28 are horizontal and the links and arms pass between the spaced pairs of guide rails 37, FIGS. 5 and 6. FIGS. 3 and 4 showing the arms 24 slightly below the horizontal also show the axes of cylinders 28 only slightly elevated above the horizontal, while the links 33 are forward of the guide rails 37 and rather steeply inclined above the arms 24.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A mechanism, for attachment to a refuse vehicle having a receiver tank body, for moving refuse containers through a long arc of travel between ground level loading and elevated inverted dumping and washing positions above said refuse vehicle, said mechanism comprising a pair of vertically swingable arms having fixed pivots, refuse container supporting means interconnecting said arms, a pair of extendable and retractable power cylinder units to operate said arms in unison, fixed pivots for the cylinder ends of said units, a pair of relatively short connector links having corresponding ends pivoted to the piston rods of said units and having other corresponding ends pivoted to said arms in spaced relation to the fixed pivots of said arms, and fixed sloping straight guide rails for the pivotal connections of said links and piston rods disposed between the fixed pivots of said arms and the cylinder bodies of said units.

2. The structure of claim 1, and said fixed guide rails comprising pairs of opposing channel bars mounted in spaced parallel relation, and pivot pins interconnecting said links and piston rods and projecting on opposite sides of said links and piston rods and having end portions engageable slidably within guide passages formed by said opposed channel bars.

3. The structure of claim 1, and said sloping guide rails having lower ends disposed near the elevation of said fixed pivots for the cylinder ends of said units and having upper ends disposed above the elevation of the last-named fixed pivots and above the fixed pivots of said arms and between the latter and the fixed pivots of said cylinder ends in triangular relationship.

4. The structure of claim 3, and the upper ends of said guide rails being relatively close to the fixed pivots of said arms and relatively distant from the fixed pivots of said cylinder ends of said units.

5. The structure of claim 2, and the spacing between the pairs of opposing channel bars being sufficient to allow passage therebetween of said arms and said connector links when the arms move between their lowered and raised working positions, said arms and said links lying substantially on the parallel axes of said power cylinder units and said channel bars spaced apart symmetrically with respect to the axes of said units.

6. The structure of claim 5, and relatively stationary support members for the fixed pivots of said arms and said pairs of channel bars.

7. The structure of claim 6, and rigid bracket means interconnecting the pairs of channel bars and said support members.

8. The structure of claim 1, and pairs of spaced upstanding gusset plates on said arms near said fixed pivots of the arms, and corresponding ends of said connector links pivotally connected to said gusset plates, said links adapted to swing between said gusset plates during movements of said arms under influence of said power cylinder units.

* * * * *